No. 607,409. Patented July 12, 1898.
D. L. FALARDEAU.
COMBINATION KITCHEN UTENSIL.
(Application filed Sept. 13, 1897.)
(No Model.) 2 Sheets—Sheet 1.

Witnesses.
Edwin G. McKee
Philip L. Masi.

Inventor.
D. L. Falardeau,
by E. W. Anderson
his Attorney.

THE NORRIS PETERS CO., PHOTO-LITHO., WASHINGTON, D. C.

No. 607,409. Patented July 12, 1898.
D. L. FALARDEAU.
COMBINATION KITCHEN UTENSIL.
(Application filed Sept. 13, 1897.)
(No Model.) 2 Sheets—Sheet 2.
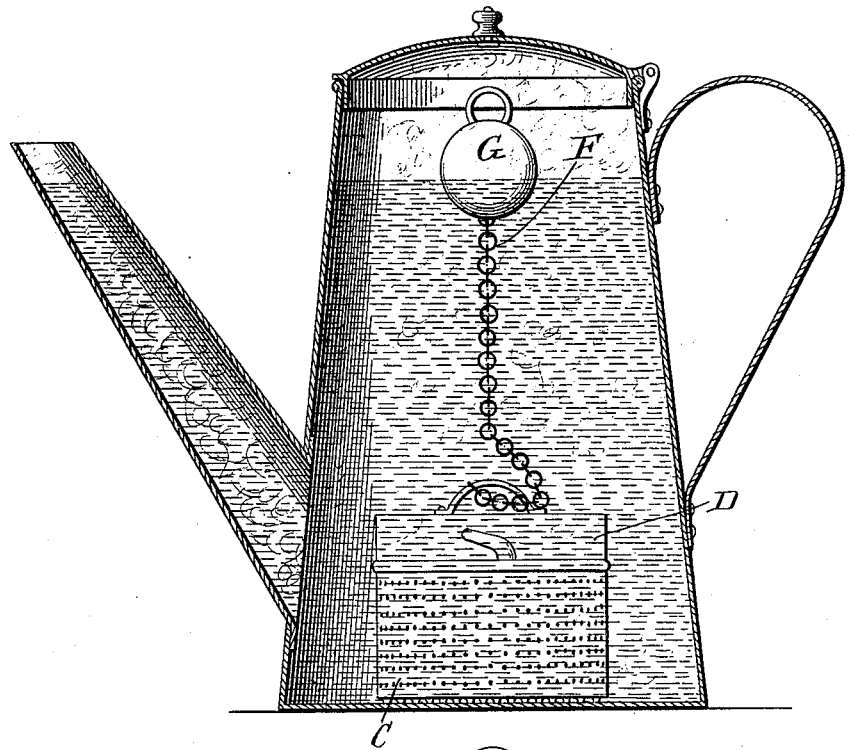
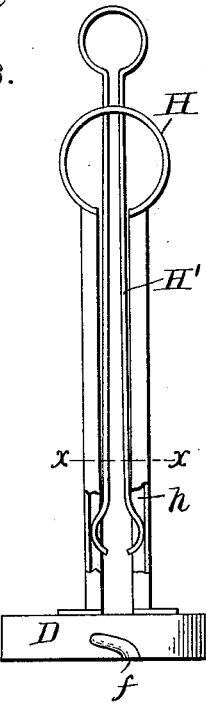
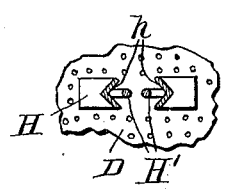
Witnesses.
Edwin G. McKee
Philip L. Masi
Inventor.
D. L. Falardeau
by E. W. Anderson
his Attorney.

UNITED STATES PATENT OFFICE.

DENNIS L. FALARDEAU, OF ALBANY, NEW YORK, ASSIGNOR OF ONE-THIRD TO THOMAS E. DONOHOE, OF SAME PLACE.

COMBINATION KITCHEN UTENSIL.

SPECIFICATION forming part of Letters Patent No. 607,409, dated July 12, 1898.

Application filed September 13, 1897. Serial No. 651,488. (No model.)

*To all whom it may concern:*

Be it known that I, DENNIS L. FALARDEAU, a citizen of the United States, and a resident of Albany, in the county of Albany and State of New York, have invented certain new and useful Improvements in a Combination Kitchen Utensil; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
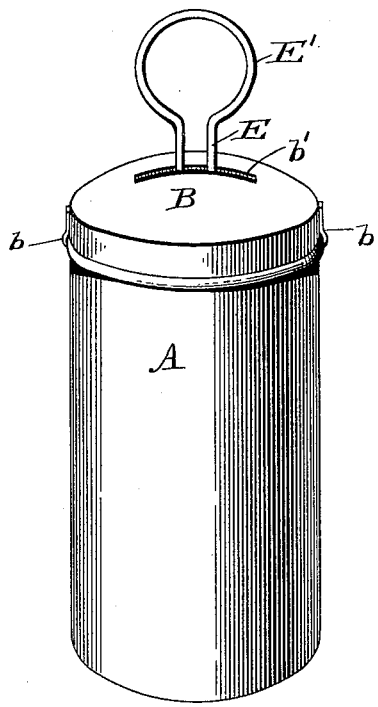
Figure 2:
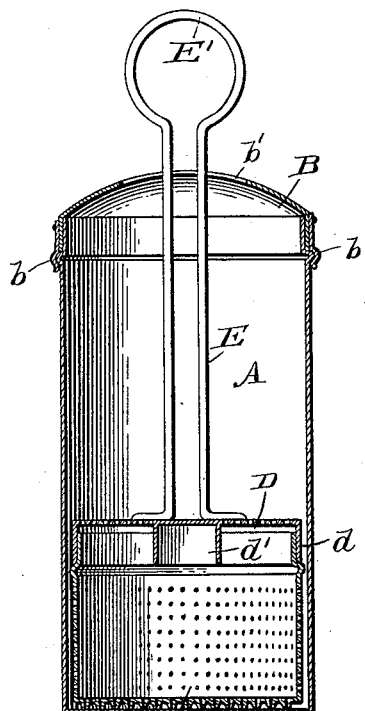
Figure 3:
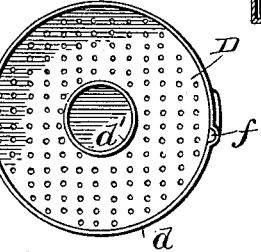
Figure 5:
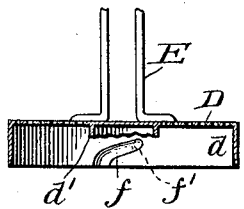
Figure 6:
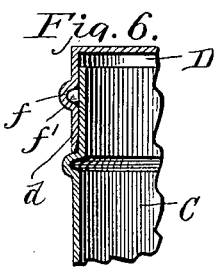
Figure 4:
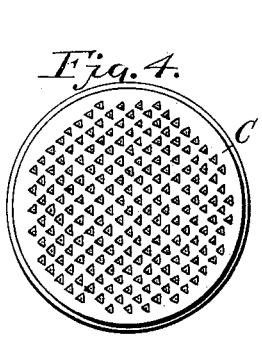

Figure 1 is a perspective view showing the complete device. Fig. 2 is a vertical section of the same. Fig. 3 is an inverted plan view of the cover and dough-cutter. Fig. 4 is a bottom plan view of the cup C. Fig. 5 is a detail sectional view of the cover $d$. Fig. 6 is a detail sectional view showing the manner in which said cover is secured. Fig. 7 is a sectional view showing a modified form of a part of the device as applied to an ordinary coffee-pot. Fig. 8 is a detail view showing a modified form of handle for the cover D. Fig. 9 is a section on the line $x\,x$, Fig. 8.

This invention has relation to a combination kitchen or cooking utensil, and is designed to provide a device of simple and convenient character which can be used as an extractor for making tea, coffee, spice extracts, &c., and also for the purpose of an egg-beater, a strainer, a dough-cutter, and a nutmeg-grater.

With these objects in view the invention consists in the novel construction and combination of parts, all as hereinafter described, and pointed out in the appended claims.

Referring to the accompanying drawings, the letter A designates a closed can or receptacle having a removable cover B, held in place by means of a suitable catch, such as indicated at $b$, or which may be of such close fit as to retain itself in place.

C designates a smaller receptacle or cup, which in the form shown has perforated side and bottom walls, although, if desired, the side walls may be imperforate. The perforations in the bottom are formed in such a manner as to provide a grating-surface. The cup has a removable cover D, formed upon its under side with an outer annular rim-flange $d$ and with an inner concentric flange $d'$. It is secured in place by any suitable means, as by the inclined groove or recess $f$ therein, which is engaged by a pin or stud $f'$ on the cup or receptacle upon rotary movement of one of the parts. The cover has connected thereto a handle E, which in the form shown is composed of wire and terminates in a loop or ring E'. The cover B is formed with an opening $b'$ of sufficient size to pass this loop or ring.

In using the device as a coffee, tea, or spice extractor the can or receptacle A is partially filled with water and is placed upon a stove or other heater until the water is raised to the desired temperature. The tea, coffee, or spice is placed in the cup C, its cover is fastened on, and said cup is then inserted into the said can or receptacle. The cover of the latter is then placed thereon. After the proper length of time the said cup is removed, bringing with it the grounds and leaving the clear liquid in the can. The cup can be used in a similar manner with an ordinary coffee or tea pot, and in Fig. 7 I have shown a modified form which is especially adapted for such use. In this form of the device, instead of the rigid handle E, I attach to the cover D one end of a chain F, whose opposite end is connected to a suitable float G.

By reason of the grating-surface on the bottom of the receptacle C said receptacle, when used in making tea, coffee, &c., is supported above the bottom of the outer vessel, thereby permitting a free circulation of the liquid through and under the receptacle.

Fig. 8 shows another form of the handle, which is made in two sections, having an extensible connection whereby it may be adjusted to suit a coffee or tea pot of any depth. I do not limit myself to the use of any particular form of extensible handle, as any one of several suitable constructions may be employed. In the form shown in this figure the inner section H is formed with guides $h$, in which slides the inner end portion of the outer section H'. Said inner end portion is of enlarged spring character, whereby it retains its adjustment by friction.

To use the device as an egg-beater, the eggs are placed in the can or vessel A, the body portion of the cup is removed from the cover, and the latter is inserted into said can and is moved up and down by means of its handle in the manner of a pump-piston. The said cover, with its flanges $d$ $d'$, which are made with thin cutting edges, forms the dough-cutter for cutting doughnuts, cakes, &c.

In using the device as a nutmeg-grater the nut is placed in the holder formed by the inner flange $d'$ of the cover D and is grated with the bottom of the cup C. When the piece of nut becomes too small to be operated upon in this manner, it is removed and held in the fingers.

The cup C may be used as a strainer.

Having thus fully described my invention, what I claim as new, and desire to secure by Letters Patent, is—

1. In a combination kitchen or cooking utensil, a perforated cup or receptacle whose bottom is formed with a grating-surface, and a detachable cover for said receptacle, provided with a handle, substantially as specified.

2. In a combination kitchen or cooking utensil, a cup or receptacle having a perforated bottom formed with a grating-surface, and a removable cover therefor having a handle, and two concentric cutting-flanges on its under side, the inner of said flanges forming a holder for a nutmeg, substantially as specified.

3. In a combination cooking utensil, a perforated cup or receptacle whose bottom is formed with a grating-surface, a detachable cover for said cup, and a handle attached to the said cover and formed in two parts having a sliding connection with each other, whereby the length of said handle may be adjusted, substantially as specified.

4. The herein-described combination kitchen or cooking utensil consisting of an outer can or receptacle having a removable slotted cover, a perforated inner cup or receptacle having a grating-surface upon its bottom, a flanged cover for said inner receptacle, and a handle connected to said cover and designed to extend out through the slot of the cover of the outer can or receptacle, substantially as specified.

In testimony whereof I affix my signature in presence of two witnesses.

DENNIS L. FALARDEAU.

Witnesses:
GEORGE T. KELLY,
PETER A. HART.